United States Patent
Friis

(10) Patent No.: US 6,459,886 B1
(45) Date of Patent: Oct. 1, 2002

(54) COMMUNICATION TERMINAL WITH A PARTITION WALL

(75) Inventor: Lars Friis, Birkerod (DK)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/185,192

(22) Filed: Nov. 3, 1998

(30) Foreign Application Priority Data

Nov. 4, 1997 (GB) ............................................. 9723316

(51) Int. Cl.$^7$ ................................................. H04B 1/38
(52) U.S. Cl. ...................... 455/90; 455/550; 455/572; 455/575
(58) Field of Search ................................ 455/456, 457, 455/422, 90, 351, 361, 429, 550, 572, 575

(56) References Cited

U.S. PATENT DOCUMENTS

| | | | |
|---|---|---|---|
| 4,912,604 A | 3/1990 | Vaisanen | 361/424 |
| 4,945,633 A | 8/1990 | Hakanen et al. | 29/825 |
| 5,006,667 A | 4/1991 | Lonka | 174/35 R |
| 5,054,120 A | * 10/1991 | Ushiyama et al. | 455/351 |
| 5,150,282 A | * 9/1992 | Tomura et al. | 361/118 |
| 5,365,410 A | 11/1994 | Lonka | 361/816 |
| 5,400,949 A | 3/1995 | Hirvonen et al. | 228/180.22 |
| 5,442,521 A | 8/1995 | Hirvonen et al. | 361/800 |
| 5,562,741 A | 10/1996 | Meadows et al. | 29/623.2 |
| 5,587,250 A | * 12/1996 | Thomas et al. | 429/3 |
| 5,603,103 A | 2/1997 | Halttunen et al. | 455/90 |
| 5,687,470 A | 11/1997 | Halttunen et al. | 29/592.1 |
| 5,742,488 A | 4/1998 | Lonka et al. | 361/816 |
| 5,796,588 A | * 8/1998 | Machida et al. | 361/773 |
| 6,058,293 A | * 5/2000 | Phillips | 455/90 |

OTHER PUBLICATIONS

United Kingdom Search Report.

* cited by examiner

Primary Examiner—Edward F. Urban
Assistant Examiner—Meless Zewdu
(74) Attorney, Agent, or Firm—Perman & Green, LLP

(57) ABSTRACT

A communication terminal, such as a handset, has a printed circuit board (PCB) sandwiched between a front cover and a back cover of the phone, and furthermore comprises at least one battery element placed between said printed circuit board and the back cover of the communication terminal. The at least one battery element and said printed circuit board are separated by a flexible and compressible partition wall. When the communication terminal is assembled, the wall provides bias between said at least one battery element and said printed circuit board.

14 Claims, 2 Drawing Sheets

COMMUNICATION TERMINAL WITH A PARTITION WALL

BACKGROUND OF THE INVENTION

The invention relates to a new architecture of housings for a communication terminal, e.g. a handset or handheld phone. Handheld phones are traditionally equipped with detachable battery packs. This is caused by the fact that some years ago the phones had a stand-by time in the range of 10 hours. The recharging time could be several hours. The user needed to have several battery packs which could easily be exchanged for his phone. Today, the typical stand-by times for standard batteries are in the range of 75–150 hours or even longer.

At present, the majority of all phones are provided with a separate battery pack that can be exchanged. U.S. Pat. No. 5,562,741 describes such a battery pack in which the battery elements are coated by a molded plastics foam material for keeping the elements in position. Recently, some phones have been provided with a battery chamber and a removable cover for the battery chamber. Then the battery is handled as an ordinary non-rechargeable battery for electrical devices. However, the rechargeable battery may be recharged both when placed inside the phone and when removed.

The invention provides a new and improved construction of a communication terminal where the battery is handled as an integrated component.

SUMMARY OF THE INVENTION

In accordance with the invention there is provided a communication terminal in which a printed circuit board (PCB) is sandwiched between a front cover and a back cover of the communication terminal. At least one battery element is placed between said printed circuit board and the back cover of the communication terminal, and said at least one battery element and said printed circuit board are separated by a flexible and compressible partition wall which, when the communication terminal is assembled, provides bias between said at least one battery element and said printed circuit board.

By leaving out the battery cover the user will no longer have access to the battery chamber, and thereby the stiff partition wall separating the battery chamber and the electronics of the handset may be left out. This reduces the number of mechanical components for the communication terminal, e.g. the phone, the volume of the phone and the costs of the phone. The relative position between the at least one battery element and said printed circuit board is kept by the mechanical bias force caused by the flexible and compressible partition wall. The partition wall is preferably formed by foamed plastics or rubber.

By providing one side of the partition wall with a conducting layer, open shielding boxes on the printed circuit board will be closed effectively. The conducting layer may be formed by gluing a metallic foil and the foamed plastics or rubber layer together.

Hereby the battery element may be treated as a component corresponding to all other components in the phone. The battery as a component is expected to have a life time corresponding to several years. With a long stand-by time and a low recharging time the users do not need to change or remove the battery. Anyway, if the battery needs to be changed, this can be done at a service site in the same manner as changing a broken LCD display.

According to a preferred embodiment the battery, e.g. a flexible Lithium-Polymer battery, is welded to the printed circuit board of the communication terminal. The terminals of the battery are advantageously provided as flexible metallic strips, and these may be welded or soldered to the printed circuit board. Thereby the printed circuit board and the battery are provided as a hinged assembly prior to the assembling of the communication terminal.

DETAILED DESCRIPTION OF THE INVENTION

Figure 1:
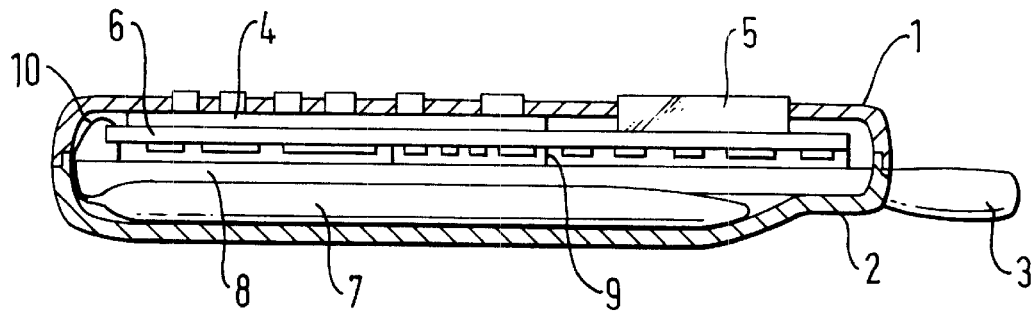
FIG. 1 is a cross-sectional view of a communication terminal, e.g. a handportable phone, having a resilient partition wall according to the invention.
Figure 4:
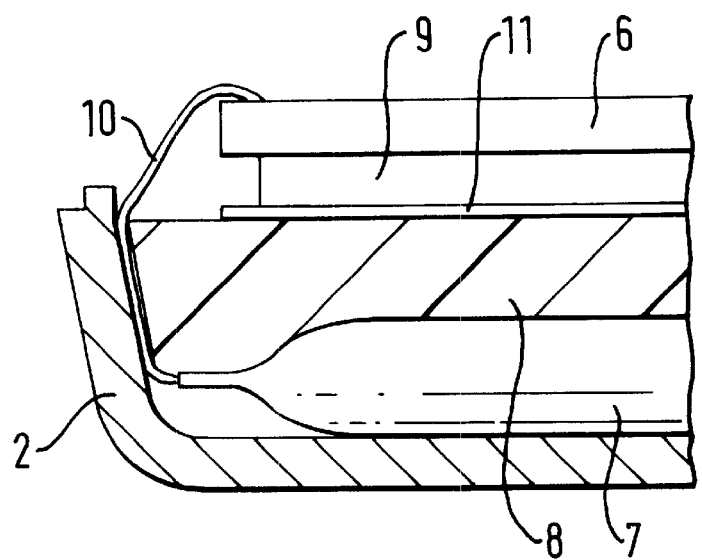
FIG. 4 shows the bottom part of the communication terminal shown in FIG. 1 on an enlarged scale and with the front cover removed.

The communication terminal according to the invention will be described below with reference to a preferred embodiment, according to which the communication terminal is used as a handset or a handportable phone for cellular or cordless use. FIGS. 1 and 4 show the preferred embodiment of the communication terminal, and it may be seen from these figures that the cover of the handset includes a front part or a front cover 1 and a rear part 2. An external antenna, e.g. a fixed helix antenna 3, may be provided at the top of the rear part 2. A keypad 4 and a display assembly 5, including a protection window, an LCD, and back light, extend though appropriate openings in the front cover 1. The keypad 4 rests on a Printed Circuit Board (PCB) 6, and depression of one of the keys in the keypad 4 will close a switch on the PCB 6. The display assembly 5 is connected to the PCB 6 via a connector known per se and does rest against the PCB 6.

The major part of the electrical components is provided on the rear part of the PCB 6, and these components are divided into compartments surrounded by metallic walls 9 welded or soldered to the PCB 6. These walls 9 are stiff and have a height slightly higher than the components inside the walls, e.g. approximately 2 mm. A flexible and resilient layer 8, e.g. a plastics foam or rubber, is sandwiched between and separates the PCB 6 and a battery 7. According to a preferred embodiment the layer 8 is provided with a conductive layer 11 on the side facing towards the PCB 6. The conductive layer 11 may be a standard metal foil, such as an aluminum foil. Due to the resilient properties of the layer 8 the foil 11 is urged against the open chambers defined by the metallic walls 9 to effectively close these with regard to EMC. The foil 11 may advantageously be glued together with the layer 8. The thickness of the foil 11 must be sufficient to avoid damage to the foil caused by contact with the walls 9. However, the strength of the foil may be increased by sandwiching a flexible non-resilient layer between the conducting foil 11 and the recipient layer 8. This flexible non-resilient layer may be paper or plastics of high strength (compared with the metal foil).

It will be seen from FIG. 1 how the rear part 2 of the cover is shaped to fit the shape of the battery 7. It will be seen at the same time that the resilient layer 8 is able to expand to ensure that the shielding chambers defined by the walls 9 and the foil 11 are closed and that the battery 7 is kept in place even if the phone is dropped.

Figure 2:
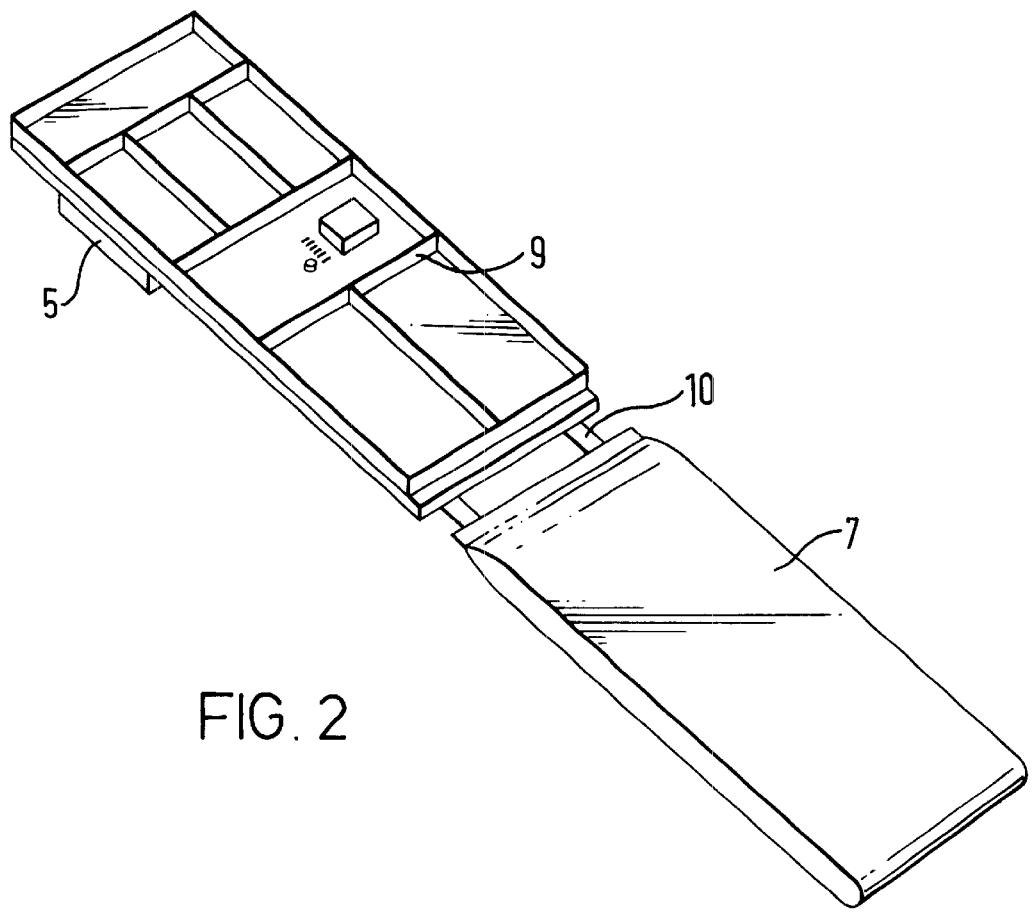
FIG. 2 is a perspective view of a printed circuit board and a battery element, such as a Li-polymer battery, for use in a handset according to the invention.
Figure 3:
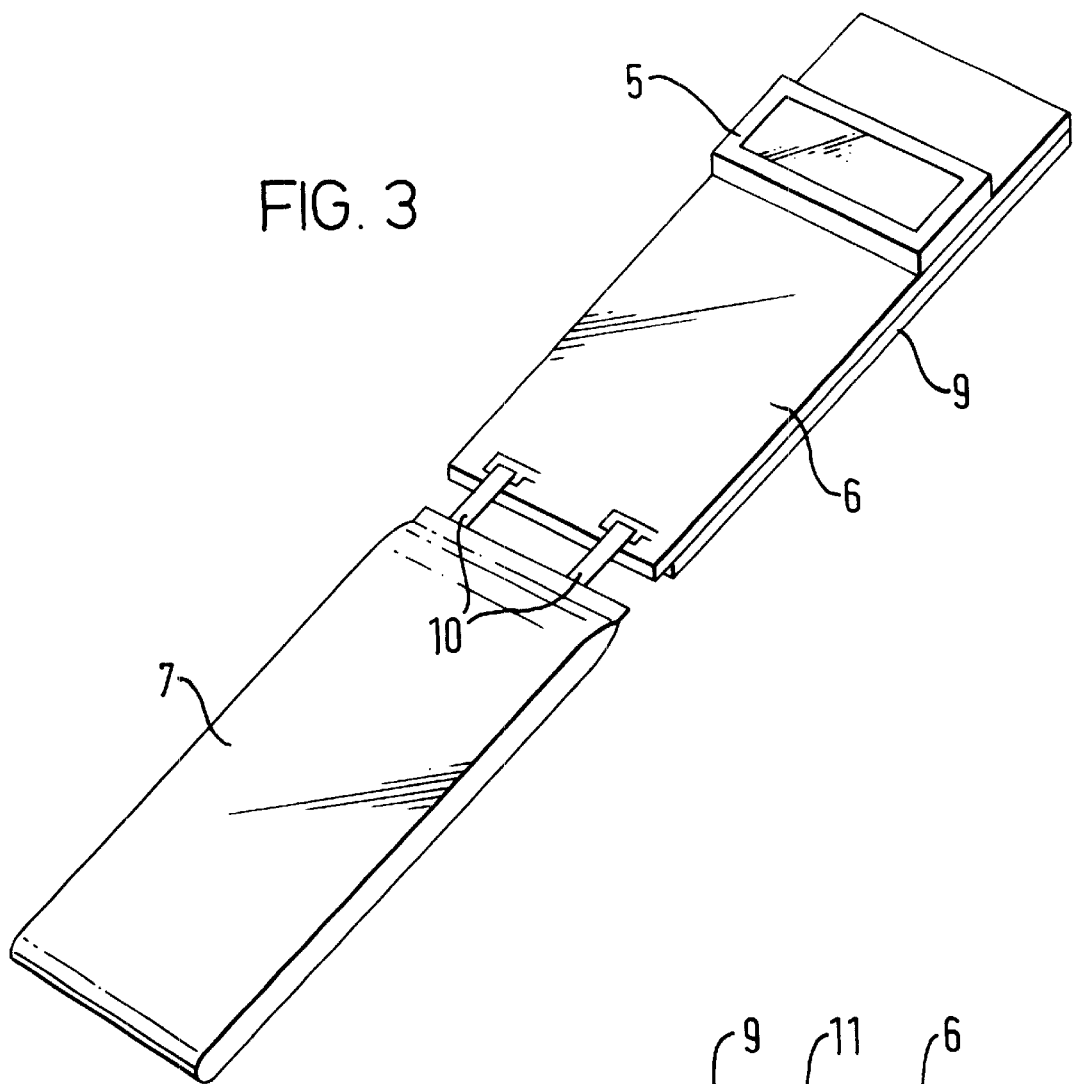
FIG. 3 is a perspective view of the assembly shown in FIG. 2, seen from the rear side.

FIGS. 2 and 3 show how the battery 7 and the PCB 6 are interconnected by two metallic strips 10 soldered to the printed circuit (not shown) on the PCB 6. The printed circuit and the components used are omitted for clarity. However, some components are indicated in one of the chambers shown in FIG. 2.

It will be seen that the conducting layer 11 at the edge part of the resilient layer 8 is stripped. This is done to avoid short circuiting of the strips 10. The PCB 6 is maintained in a proper position relative to the cover parts 1 and 2 by screw towers known per se and resting projections. These parts will be evident to a person skilled in the art.

Embodiments of the invention are especially useful when the battery 7 is shaped as a flat component with approximately the same shape as the PCB 6. Here the Lithium-Polymer technology will match the invention. However, other known battery technologies may be used, and new technologies will be developed.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What is claimed is:

1. A communication terminal having a printed circuit board (PCB) sandwiched between a front cover and a back cover of the communication terminal, and furthermore comprising at least one battery element placed between the printed circuit board and the back cover of the communication terminal, the at least one battery element and the printed circuit board being separated by a flexible, separate and compressible partition wall that is substantially parallel with other members in the sandwiched structure and which, when the communication terminal is assembled provides bias between the at least one battery element and the printed circuit board, the printed circuit board overlying the battery element, wherein the printed circuit board and the battery are provided as an interconnected assembly prior to the assembling of the communication terminal.

2. A communication terminal according to claim 1 wherein the partition wall is provided as a layer of foamed plastics.

3. A communication terminal according to claim 1 wherein the partition wall is provided as a layer of foam rubber.

4. A communication terminal according to claim 1 wherein the partition wall is coated with a metallic foil on the surface facing towards the printed circuit board, and wherein groups of components on the printed circuit board are surrounded by conducting walls to provide open boxes which are closed by the metallic foil on the partition wall.

5. A communication terminal according to claim 1 wherein the battery is welded or soldered to the printed circuit board of the communication terminal via flexible metallic connectors.

6. A communication terminal according to claim 1 wherein the communication terminal is a handportable phone for cellular or cordless communication.

7. A communication terminal as in claim 1 wherein the battery element is non-removably connected to the printed circuit board.

8. A communication terminal as in claim 1 wherein the battery element is separated from the printed circuit board by the partition wall over a substantial portion of its length.

9. A communication terminal having a housing including a front cover and a rear cover, and the terminal further including:
   a printed circuit board having a plurality of shielding walls for providing a number of open shielding boxes;
   at least one battery element for being placed between the printed circuit board and the rear cover of the communication terminal; and
   a flexible, separate and compressible partition wall separating the at least one battery element and the printed circuit board and biasing the metallic foil coated on the surface of the partition wall towards the open shielding boxes, the printed circuit board overlying the battery element, wherein the printed circuit board and the battery are provided as an interconnected assembly prior to the assembly of the communication terminal.

10. A communication terminal as in claim 9 wherein the battery element is non-removably connected to the printed circuit board.

11. A communication terminal as in claim 9 wherein the battery element is separated from the printed circuit board by the partition wall over a substantial portion of its length.

12. A communication terminal having a housing including a front cover and a rear cover, and the terminal further including:
   a printed circuit board having a plurality of shielding walls for providing a number of open shielding boxes;
   at least one battery element being placed between the printed circuit board and the rear cover of the communication terminal; and
   a flexible, separate and compressible partition wall having a metal foil coated on a surface of the partition wall, the partition wall separating the at least one battery element and the printed circuit board and biasing the metallic foil coated on the surface of the partition wall toward the open shielding boxes, the printed circuit board overlying the battery element, wherein the printed circuit board and the battery are provided as an interconnected assembly prior to the assembly of the communication terminal.

13. A communication terminal as in claim 12 wherein the battery element is non-removably connected to the printed circuit board.

14. A communication terminal as in claim 12 wherein the battery element is separated from the printed circuit board by the partition wall over a substantial portion of its length.

* * * * *